US006968874B1

(12) United States Patent
Gabbey et al.

(10) Patent No.: US 6,968,874 B1
(45) Date of Patent: Nov. 29, 2005

(54) CAPLESS AUTOMOTIVE FUELING SYSTEM

(75) Inventors: David John Gabbey, Pinckney, MI (US); Daniel Paul Cunkle, Jonesville, MI (US)

(73) Assignee: Martinrea Industries, Inc., Dexter, MI (US)

( * ) Notice: Subject to any disclaimer, the term of this patent is extended or adjusted under 35 U.S.C. 154(b) by 31 days.

(21) Appl. No.: 10/960,816

(22) Filed: Oct. 7, 2004

(51) Int. Cl.$^7$ .................................................. B65B 1/04
(52) U.S. Cl. ...................... 141/349; 141/348; 141/382; 220/86.2
(58) Field of Search ................................ 141/2, 18, 97, 141/348–352, 363–366, 369, 370, 382; 220/86.2

(56) References Cited

U.S. PATENT DOCUMENTS

| | | | |
|---|---|---|---|
| 1,810,366 A | 6/1931 | Martin | |
| 3,545,363 A | 12/1970 | Bricher | 95/89 |
| 3,730,216 A * | 5/1973 | Arnett et al. | 137/588 |
| 3,845,877 A | 11/1974 | Arnett et al. | 220/86 |
| 3,880,214 A | 4/1975 | Slavin | 141/346 |
| 3,911,977 A | 10/1975 | Berger | 141/348 |
| 3,994,323 A | 11/1976 | Takahata et al. | 141/302 |
| 4,034,784 A | 7/1977 | Ball et al. | 141/348 |
| 4,153,085 A | 5/1979 | Adams | 141/311 |
| 4,248,279 A | 2/1981 | Warmbold | 141/348 |
| 4,526,216 A | 7/1985 | Lake, Jr. | 141/348 |
| 4,635,813 A | 1/1987 | Peickert | 220/86 |
| 4,977,936 A | 12/1990 | Thompson et al. | 141/312 |
| 5,056,570 A | 10/1991 | Harris et al. | 141/59 |
| 5,071,018 A | 12/1991 | Moore | 220/86.2 |
| 5,271,438 A | 12/1993 | Griffin et al. | 141/59 |
| 5,465,861 A | 11/1995 | Kunz et al. | 220/260 |
| 5,730,194 A | 3/1998 | Foltz | 141/301 |
| 6,009,920 A | 1/2000 | Palvoelgyi et al. | 141/348 |
| 6,026,853 A | 2/2000 | Osterbrink | 137/527.4 |
| 6,092,685 A | 7/2000 | Gruber | 220/86.2 |
| 6,155,316 A | 12/2000 | Benjey | 141/348 |
| 6,189,581 B1 | 2/2001 | Harris et al. | 141/348 |
| 6,302,169 B1 * | 10/2001 | Pulos | 141/301 |
| 6,382,270 B1 * | 5/2002 | Gzik | 141/94 |
| 6,679,396 B1 | 1/2004 | Foltz et al. | 220/86.2 |
| 6,722,407 B2 | 4/2004 | Henry | 141/350 |

FOREIGN PATENT DOCUMENTS

| | | |
|---|---|---|
| DE | 4039269 | 2/1992 |
| DE | 10037824 A1 | 8/2000 |
| DE | 10157090 C1 | 11/2001 |
| DE | 10051212 | 7/2002 |
| EP | 1284212 B1 | 7/2002 |

(Continued)

*Primary Examiner*—Timothy L. Maust
(74) *Attorney, Agent, or Firm*—Gifford, Krass, Groh, Sprinkle, Anderson & Citkowski, P.C.

(57) ABSTRACT

A capless automotive fueling system having a funnel with a port open to receive a fuel filling nozzle. A spring loaded valve is movable between an open position in which the port is open and a closed position in which the fuel valve overlies and sealingly covers the port. A shield is movable between a first position in which the shield overlies and covers the valve, and a second position in which the shield is laterally disposed to one side of the valve to permit insertion of the fuel filling nozzle. A motor is drivingly connected to the shield and, on activation, moves the shield from its first and to its second position. Alternatively, two latches engage the valve to retain the valve in a closed position. Upon insertion of a properly sized fuel nozzle, the nozzle engages the latches and pivots them to an open position.

12 Claims, 12 Drawing Sheets

FOREIGN PATENT DOCUMENTS

| | | |
|---|---|---|
| EP | 1262355 | 12/2002 |
| GB | 2266518 A | 11/1993 |
| JP | 04108035 A | 4/1992 |
| JP | 05305826 A | 11/1993 |
| JP | 08127255 A | 5/1996 |
| JP | 09286247 A | 11/1997 |

\* cited by examiner

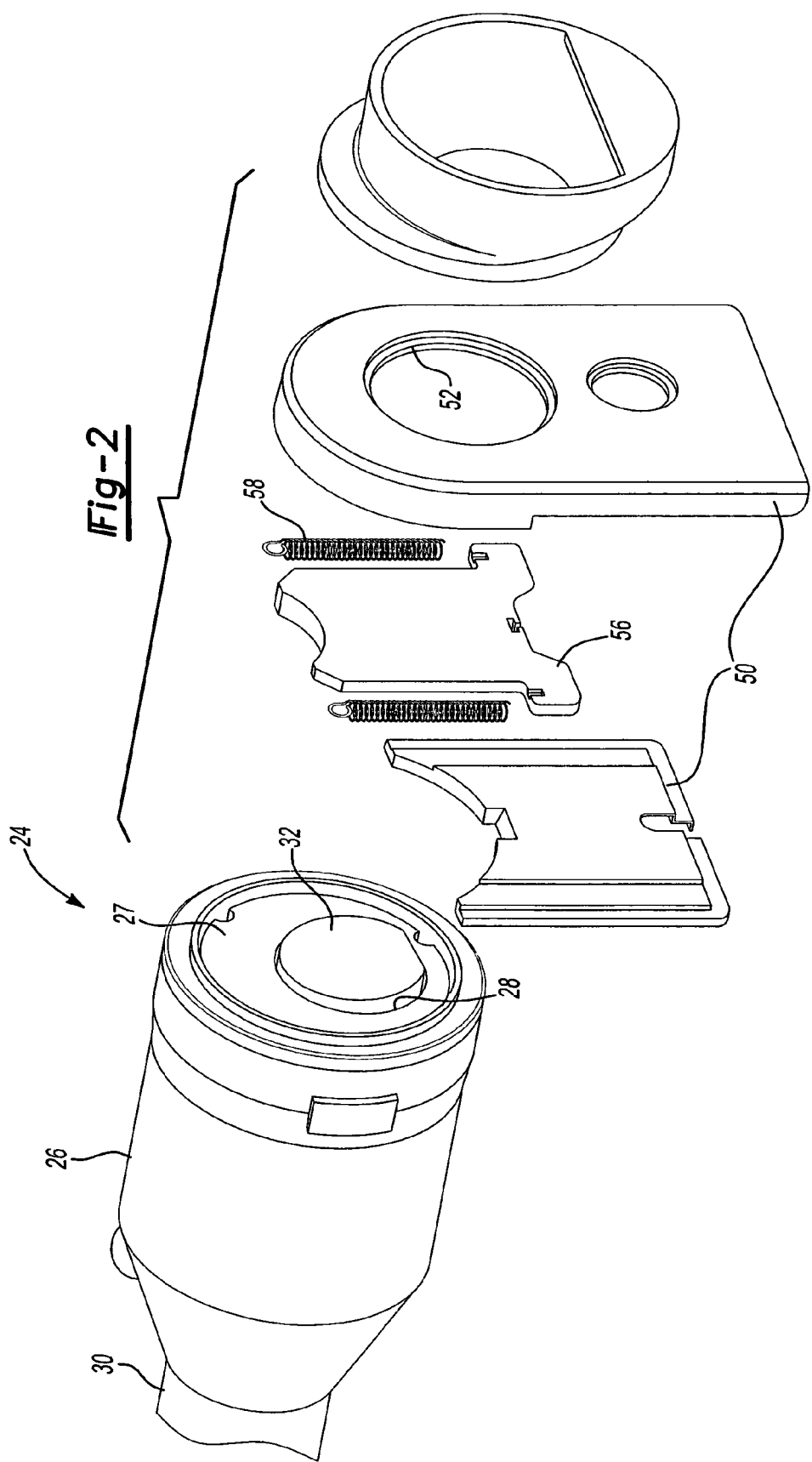

CAPLESS AUTOMOTIVE FUELING SYSTEM

BACKGROUND OF THE INVENTION

I. Field of the Invention

The present invention relates to fueling systems for automotive vehicles and, more particularly, to a capless automotive fueling system.

II. Description of Related Art

All automotive vehicles include fueling systems to allow the fuel tank for the vehicle to be refilled. Typically, the fueling systems include a funnel which is dimensioned to receive a conventional fuel filling nozzle. The funnel in turn is connected to the fuel tank for the vehicle.

Many of these fuel filling systems also include an orifice inserted into or formed in the funnel which is dimensioned to receive the neck of the fuel filling nozzle. A spring loaded flapper valve is oftentimes mounted to the funnel and movable between an open and a closed position. In its closed position, the valve closes the port in the fuel funnel to trigger a premature shutoff of a too-large diameter nozzle tip by blocking the majority of the fuel flow. Conversely, upon insertion of the fuel filling nozzle into the port, the nozzle moves the fuel valve to its open position to allow the fuel tank to be filled in the conventional fashion.

Current government regulations, conventionally known as the Clean Air Act, restrict the amount of fuel vapors that may escape from the fuel system for environmental reasons. Such government regulations, furthermore, increasingly restrict the amount of fuel vapor escape from the automotive fuel system over time.

For this reason and to prevent contaminants from entering the fuel tank, the previously known automotive fueling systems include a gas cap which is secured over the open end of the funnel following a refueling operation. However, the failure of the vehicle operator to secure the gas cap onto the fuel filling funnel with sufficient torque will cause insufficient sealing between the fuel funnel and the gas cap. When this occurs, fuel vapors from the gas tank in excess of that permitted by governmental regulations escape past the gas cap and, for newer North American market vehicles, activate a warning light for the vehicle operator.

When such a warning light is illuminated for the vehicle operator, the vehicle operator oftentimes returns the vehicle to the vehicle dealer or other maintenance facility only to discover that the only vehicle "malfunction" is that the gas cap has been too loosely installed on the vehicle. This presents not only an inconvenience for the vehicle operator, but a major warranty expense for the automotive vehicle manufacturer.

A still further disadvantage of the conventional fuel filling systems for automotive vehicles is that the flapper valve which closes the funnel port is freely movable between an open and a closed position. This flapper valve is moved to its open position upon the insertion of a fuel nozzle.

Fuel nozzles have standardized diameters depending on the type of the fuel. For example, a fuel nozzle for unleaded gasoline has a first diameter while a fuel nozzle for diesel fuel has a second and larger diameter.

Furthermore, the size of the fuel port in the fuel funnel assembly is dimensioned for the type of fuel utilized by the engine. Consequently, since the fuel nozzle for diesel fuel has a larger diameter than the fuel nozzle for unleaded gasoline, the fuel nozzle for diesel fuel cannot be inserted into the fuel funnel assembly for a vehicle which utilizes unleaded gasoline.

Unfortunately, the converse is not true. Instead, since the fuel nozzle for unleaded gasoline is smaller in diameter than the fuel nozzle for diesel fuel and also since the fuel flapper valve is freely pivotally mounted to the fuel funnel assembly, it is possible to inadvertently fill the fuel tank of a vehicle having a diesel engine with unleaded gasoline. This, in turn, results in damage if not destruction of the engine.

In one prior art device flexible latches engage and retain the fuel valve in a closed position. Upon insertion of a properly sized fuel nozzle, the fuel nozzle engages the latches and flexes the latches outwardly to disengage from the fuel valve and allow the fuel valve to open. However, repeated flexing of the latches can result in weakening or even breakage of the latches thus rendering them inoperable.

SUMMARY OF THE PRESENT INVENTION

The present invention provides a capless automotive fueling system which overcomes all of the above-mentioned disadvantages of the previously known devices.

In brief, the capless automotive fueling system of the present invention comprises a conventional fuel funnel with a funnel insert which has a port dimensioned to receive the neck of a conventional fuel filling nozzle. In the conventional fashion, the inner end of the nozzle is fluidly connected to the fuel tank for the automotive vehicle so that, upon activation of the fuel filling nozzle, the fuel tank is filled with fuel.

A fuel valve is mounted to the funnel insert and movable between an open and a closed position. In its closed position, the fuel valve overlies and sealingly covers the fuel port thus precluding the escape of fuel vapors from the gas tank through the fuel funnel. Conversely, upon insertion of the fuel filling nozzle through the funnel port, the fuel filling nozzle moves the fuel valve to its open position. A spring normally urges the fuel valve towards its closed position.

In order to protect the fuel valve from environmental hazards which may result in leakage of fuel vapors from the fuel tank and through the funnel, the system of the present invention includes a shield which is movable between a first position and a second position. In its first position, the shield overlies, covers and protects the fuel valve from the environment. Conversely, in its second position, the shield is moved laterally to one side of the valve to permit insertion of the fuel filling nozzle through the funnel port in the desired fashion.

At least one spring is connected between the funnel insert and the shield to urge the shield towards its closed position. In order to move the shield to its open position, a motor or other actuation means is drivingly connected to the shield by a cable. Upon activation of the motor, the motor moves the shield from its first position in which the shield overlies the fuel valve, and the second position in which the shield exposes the fuel valve for filling by the fuel nozzle.

In a second embodiment of the invention, the automotive fueling system includes a funnel assembly having a circular port adapted to receive a fuel filling nozzle. A fuel valve is pivotally mounted to the funnel assembly and is movable between an open position in which the port is open, and a closed position in which the fuel valve overlies and seals the port. This fuel valve also includes a pair of diametrically opposed recesses on its outer periphery.

At least one and preferably rigid latches are pivotally mounted to the fuel assembly. These latches are independently movable between a locked position in which either one or both of the latches engage the valve recesses and retain the valve in its closed position, and an unlocked position in which the latches disengage from the valve recesses and enable the valve to move to its open position.

Each latch, furthermore, includes an actuator surface which is engageable by a fuel nozzle inserted into the funnel to move the latches from their locked and to their unlocked position. However, since the latches are independently movable and since only one latch is sufficient to retain the flapper valve in its closed position, both latches must be disengaged from the flapper valve before fueling can begin. Consequently, only a fuel nozzle of the proper size will simultaneously engage the latches and move them to their unlocked position and enable fueling of the vehicle.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 2 is an exploded view of a preferred embodiment of the present invention;

DETAILED DESCRIPTION OF A PREFERRED EMBODIMENT OF THE PRESENT INVENTION

Figure 1:
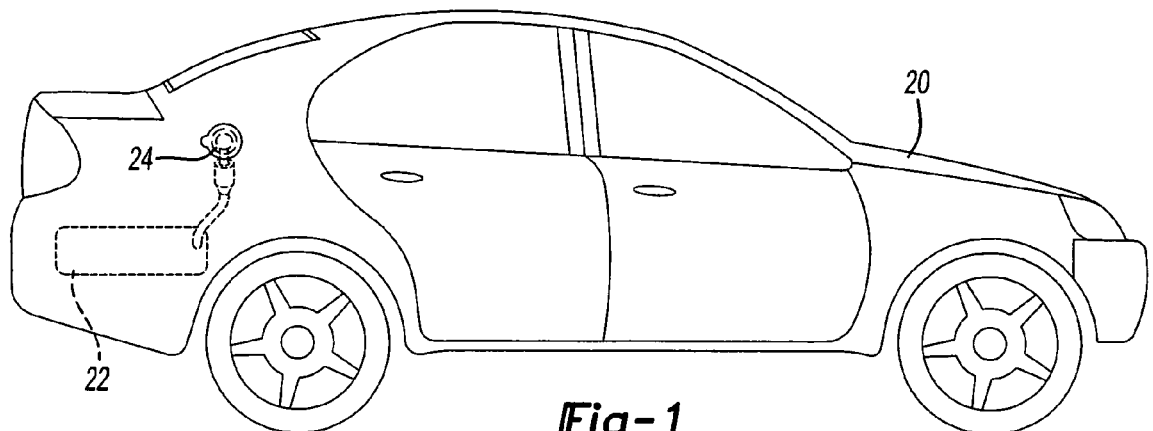
FIG. 1 is a side view of a vehicle having a capless automotive fueling system of the present invention.

With reference first to FIG. 1, a conventional automotive vehicle 20 is shown having a fuel tank 22. A capless automotive fuel filling system 24, which will be hereinafter described in greater detail, is associated with the fuel tank 22 to enable the fuel tank 22 to be filled with fuel when desired.

Figure 3:
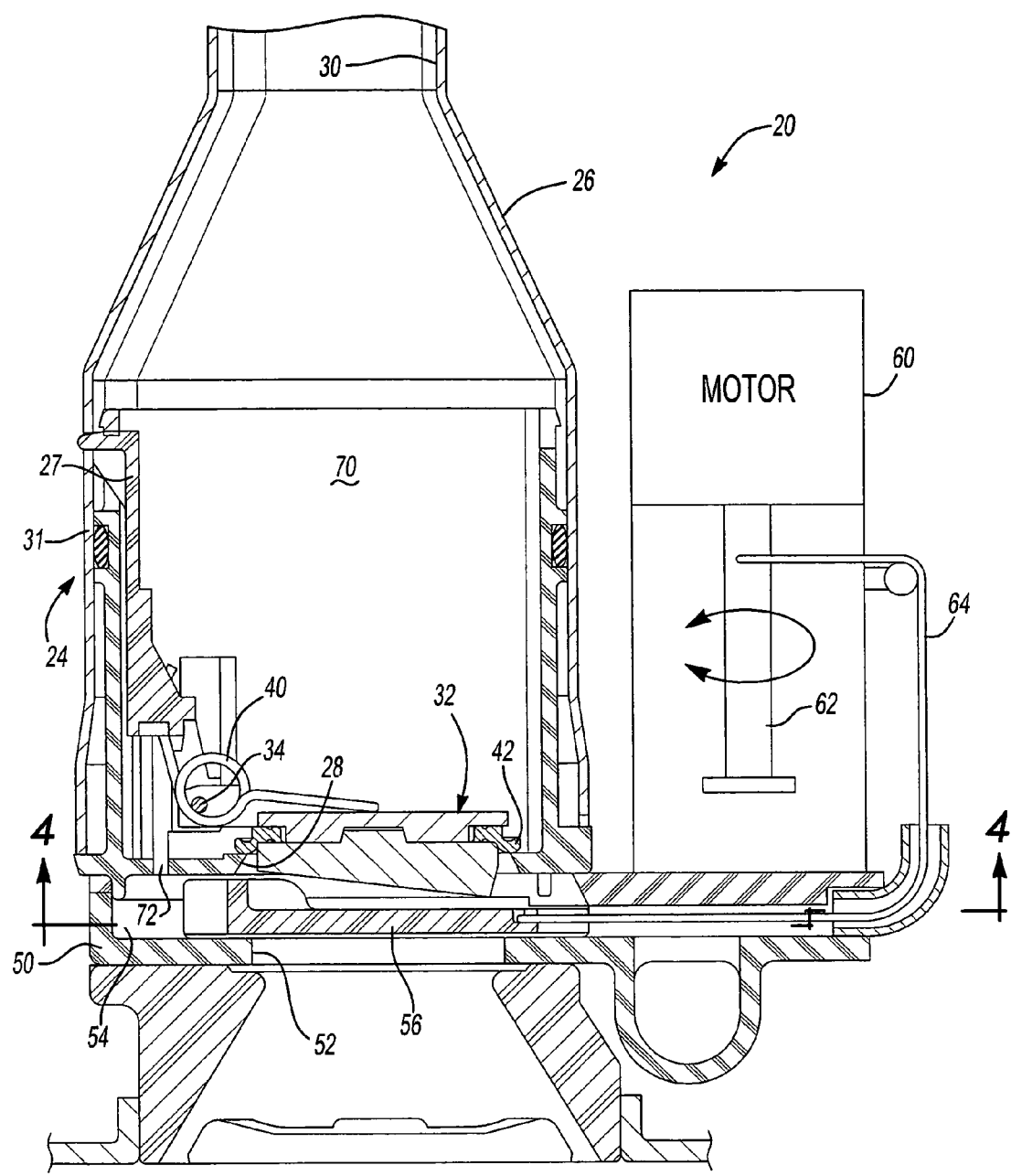
FIG. 3 is a longitudinal sectional view of the preferred embodiment of the invention and illustrating the shield in its first position.
Figure 4:
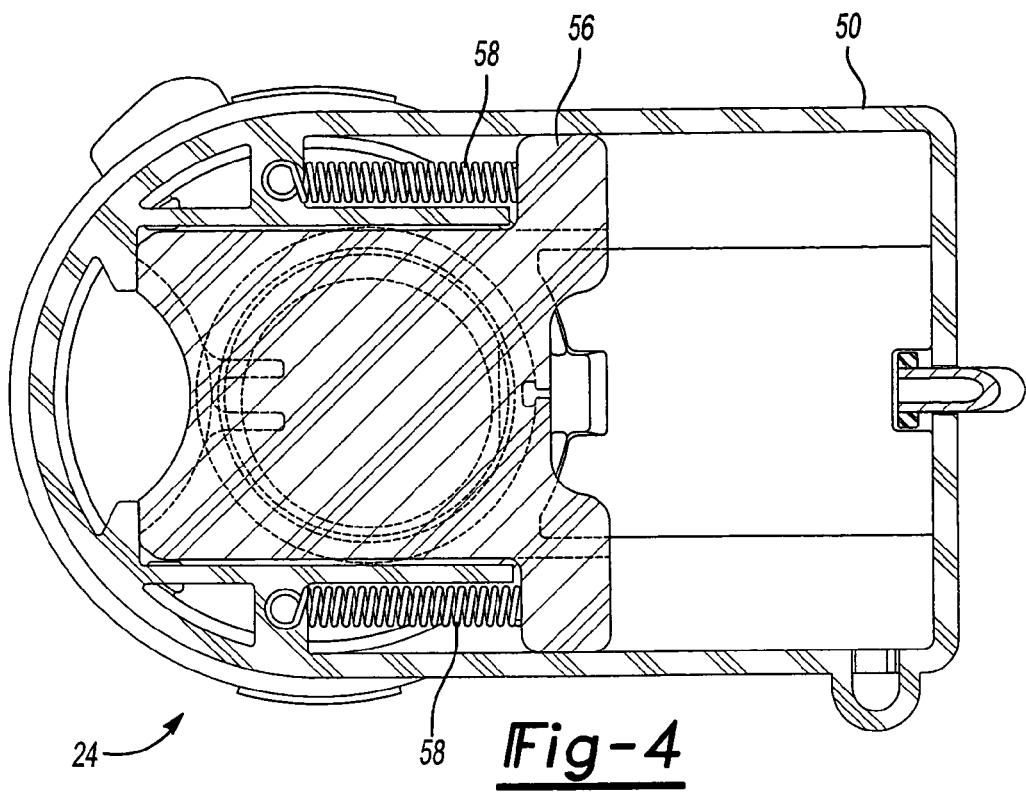
FIG. 4 is a sectional view taken along line 4—4 in FIG. 3.

With reference now to FIGS. 2–4, the fueling system 24 is there shown in greater detail and includes a fuel funnel 26 having a cylindrical funnel insert mounted with its open end and fluidly sealed to the funnel 26 by an annular seal 31. A fluid port 28 is formed in the funnel insert 27 and an inner end 30 of the funnel 26 is fluidly connected to the fuel tank 22.

Figure 8:
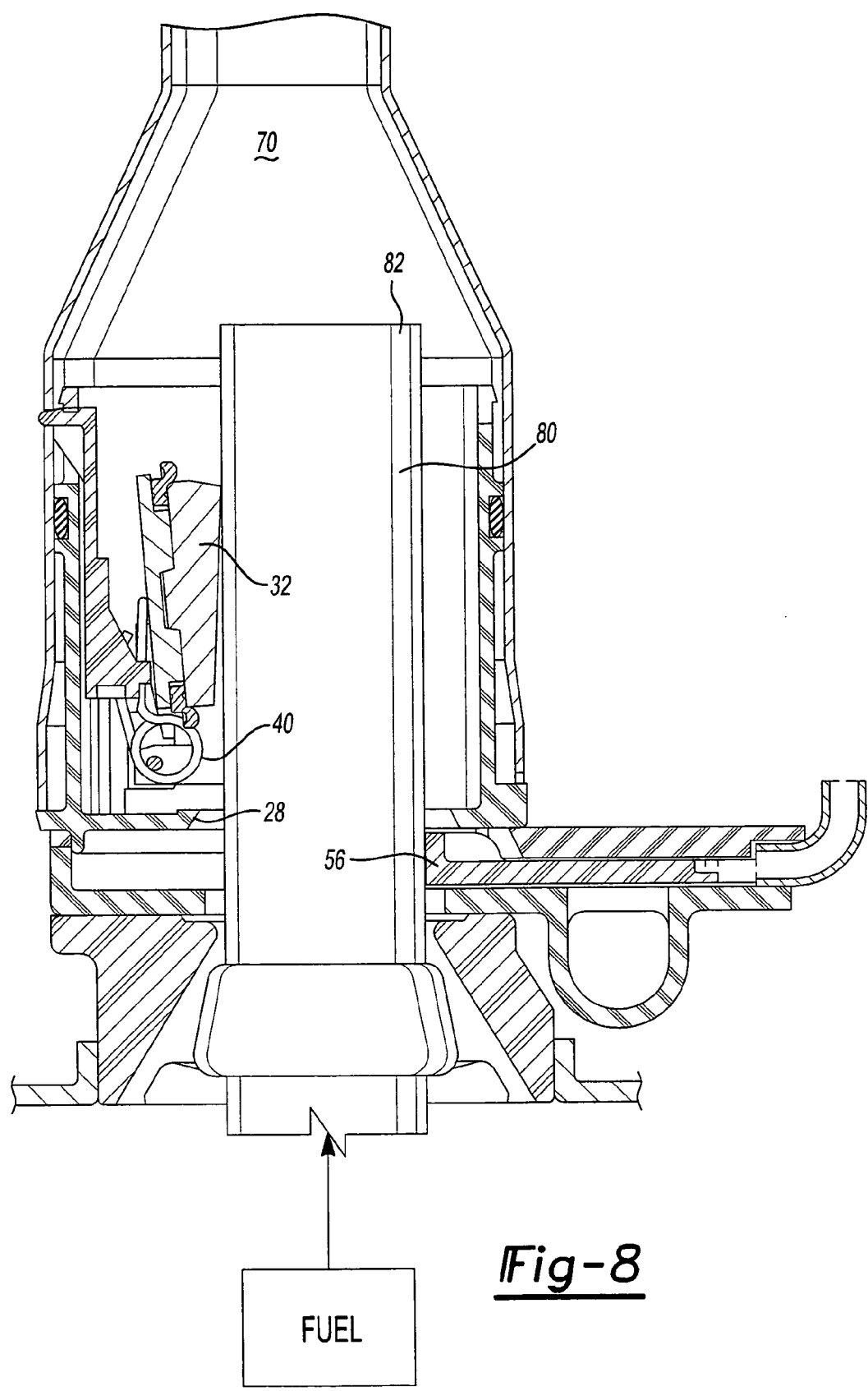
FIG. 8 is a view similar to FIG. 3 but illustrating a fuel filling operation.

As best shown in FIGS. 2 and 3, a fuel valve 32 is mounted to the funnel insert 27 by a pivot pin 34 (FIG. 3) and movable between a closed position, illustrated in FIG. 3, and an open position illustrated in FIG. 8. A spring 40 urges the fuel valve 32 towards its closed position. Furthermore, as best shown in FIG. 3, when in its closed position, a seal 42 engages the funnel insert 27 and sealingly engages the valve 32 to the funnel insert 27 and thus to the funnel 26. Consequently, when the fuel valve 32 is in its closed position, as illustrated in FIG. 3, the fuel valve 32 prevents the escape of fuel vapors from the fuel tank 22 and out through the port 28 in the funnel insert 27.

Referring again to FIGS. 2–4, a shield housing 50 is disposed over and connected to the funnel insert 27 by any conventional means such that the shield housing 50 overlies the port 28. Once the shield housing 50 is connected to the funnel insert 27, an opening 52 in the shield housing 50 is aligned with the port 28. Additionally, the shield housing 50 forms a channel 54 between the shield housing 50 and the funnel insert 27.

Figure 7:
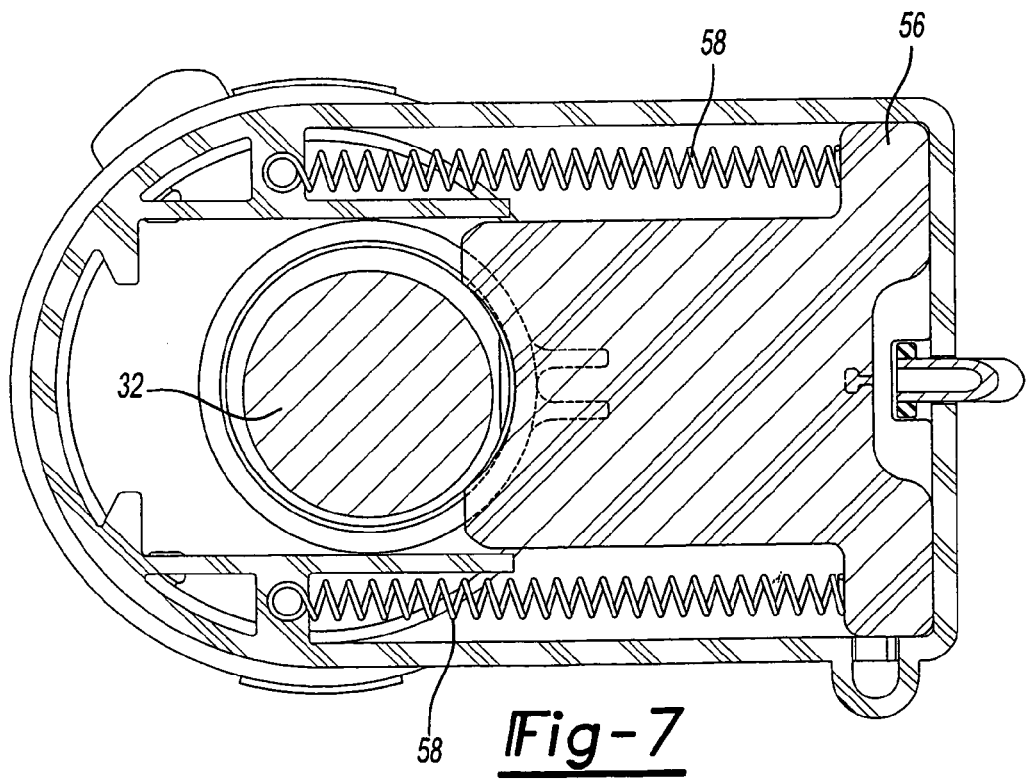
FIG. 7 is a view taken substantially along line 7—7 in FIG. 6.

With reference now to FIGS. 2–4 and 7, a generally planar shield 56 is slidably mounted within the channel 54 and movable between a first position, illustrated in FIG. 4, and a second position, illustrated in FIG. 7. In its first position (FIG. 4) the shield 56 overlies the funnel insert port 28 and thus overlies the fuel valve 32. Conversely, when the shield is moved to its second position (FIG. 7) the shield 56 exposes the fuel valve 32 to enable a fuel filling operation.

At least one, and preferably two springs 58 are each secured at one end to the shield 56 and at their other end to the shield housing 50. These springs 58 normally urge the shield 56 towards its first or closed position (FIG. 4).

In order to move the shield 56 from its first position and to its second position, and thus allow a fuel filling operation, the automotive fuel system 20 of the present invention includes a motor 60 which is preferably mounted to the shield housing 50. The motor 60 is preferably an electric motor although other types of actuating mechanisms may alternatively be used.

The motor 60 includes an output shaft 62 which, upon activation, is rotatably driven in a predetermined direction. An elongated cable 64 has one end connected to the shaft 62 and its other end connected to the shield 56. Consequently, upon activation of the motor 60, the motor 60 winds the cable 64 about the upper shaft 62 thus moving the shield 56 from its first position (FIG. 4) and to its second position (FIG. 7).

It will be understood, of course, that the driving connection between the motor 60 and the shield 56 illustrated in FIG. 3 is by way of illustration only. Furthermore, any conventional driving mechanism, such as a worm gear drive and/or the like, may alternatively be used to displace the shield 56 in its guide channel 54 upon activation of the motor 60.

The operation of the capless fueling system will now be described. In between fueling operations, the shield 56 is normally in the first position illustrated in FIG. 3 thus protecting the fuel valve 32 from the environment as well as any contaminants contained in the environment. During this condition, the seal 42 on the fuel valve 32 maintains an adequate seal between the funnel insert 27 and the fuel valve 32 sufficient to prevent the escape of fuel vapors from the fuel tank through the valve port 28. In many situations, however, a pressure differential may arise between a chamber 70 within the funnel 26 between the fuel tank 22 and fuel valve 32. Such a pressure differential may exert a closing pressure on the fuel valve 32, or vice versa. In order to prevent an excessive pressure differential between the fuel tank 22 and ambient air, a pressure relief valve 72 is optionally provided between the chamber 70 and ambient air.

Figure 5:
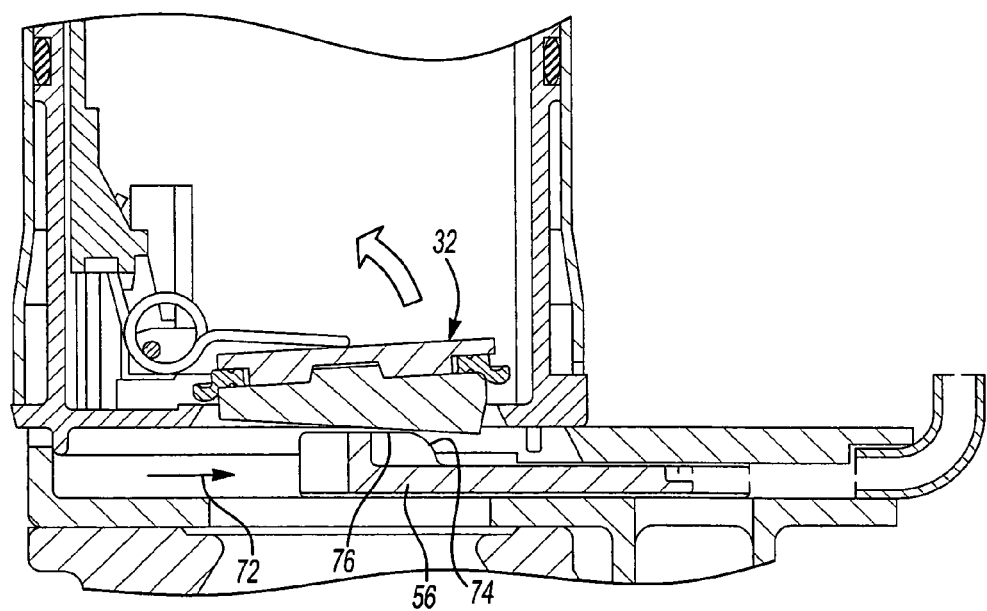
FIG. 5 is a view similar to FIG. 3 but illustrating the shield as it is moved partway from its first and to its second position.

With reference now particularly to FIG. 5, when refilling of the fuel tank 22 is desired, the motor 60 is activated which laterally displaces the shield 56 in the direction of arrow 72 from its first position and towards its second position. Furthermore, as the shield 56 is moved from its first position and towards its second position, a ramp surface 74 on the shield 56 engages a complementary ramp surface 76 on the fuel valve 32 thus moving the fuel valve 32 to a partially open position as illustrated in FIG. 5. Furthermore, by slightly opening the valve 32 in response to movement of the shield 56 from its first position and to its second position, the shield 56 relieves any pressure differential that may be present between the funnel chamber 70 and ambient air.

Figure 6:
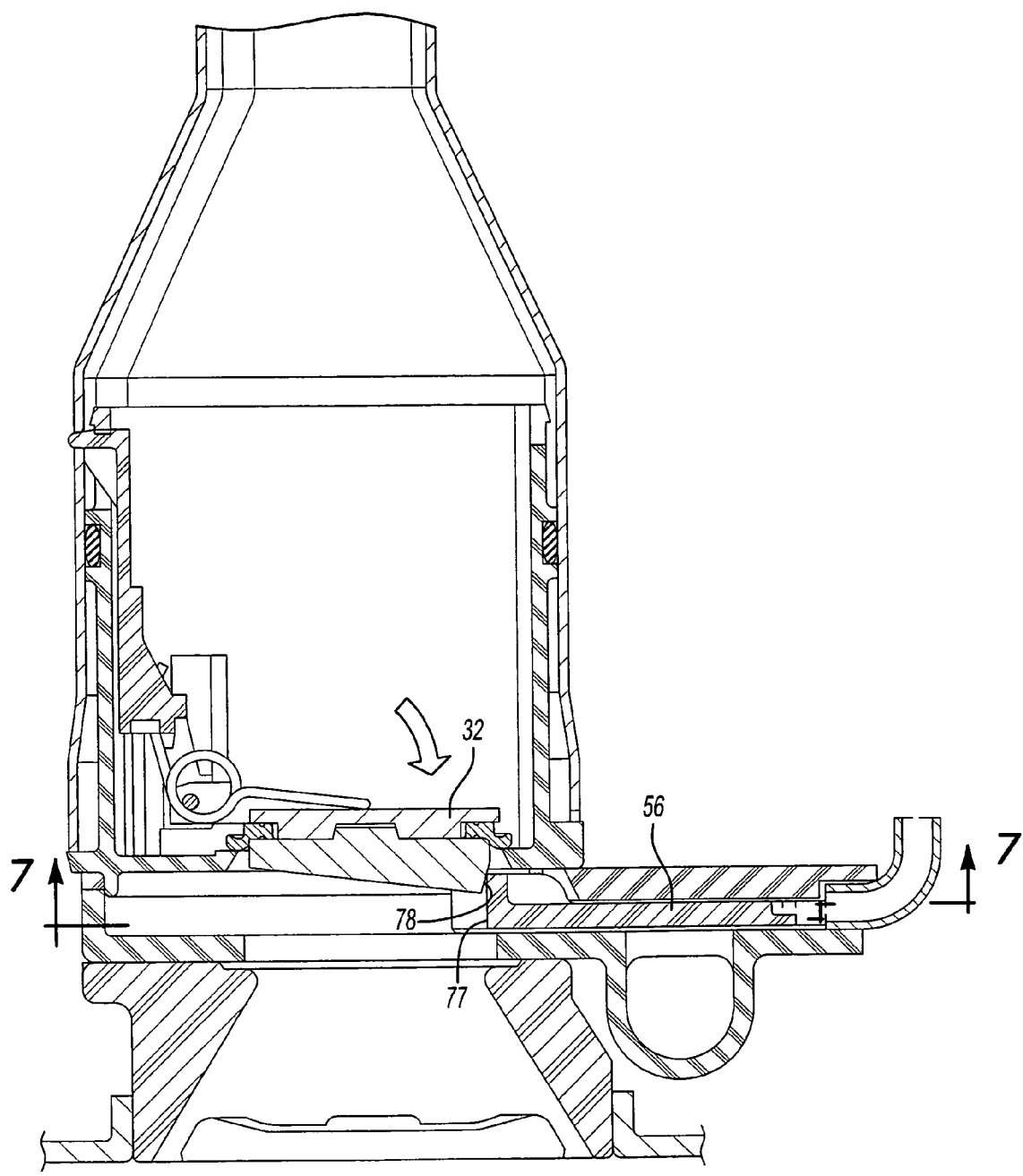
FIG. 6 is a view similar to FIG. 3 but illustrating the shield in the second position.

With reference now particularly to FIG. 6, when the shield 56 is moved to its second position, an abutment surface 77 on the shield 56 engages an abutment surface 78 on the valve 32 due to the force of the springs 58 acting on the shield 56. Thus, even upon deactivation of the motor, the coaction between the catch surfaces 77 and 78 on the shield 56 and 32, respectively, will maintain the shield 56 in its second position.

With reference now to FIG. 8, with the shield in its second position, a conventional fuel nozzle 80 is inserted through the port 28 thus moving the fuel valve 32 to its open position. In doing so, the distal end 82 of the fuel nozzle 80 is positioned in the funnel chamber 70 whereupon conventional refueling of the vehicle fuel tank 22 can begin.

The insertion of the fuel nozzle 80 through the port 28 also disengages the fuel valve abutment surface 78 from the shield abutment surface 77. When this occurs, the shield 56 laterally shifts due to the force of the springs 58 towards its first position until the shield 56 abuts against the side of the fuel nozzle neck 80. Thereafter, upon completion of the fuel filling operation and withdrawal of the fuel nozzle neck 80 from the funnel 70, the springs 58 return shield 56 to its first position (FIG. 3).

Figure 9:
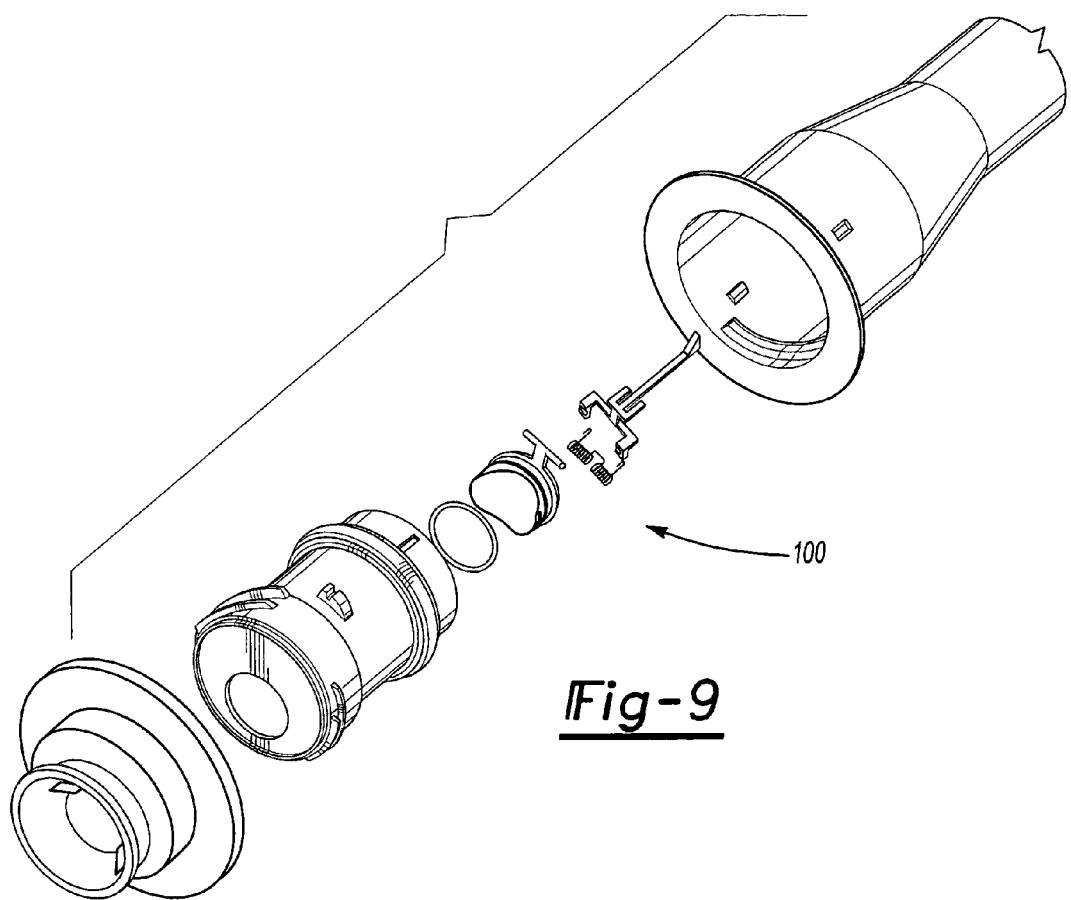
FIG. 9 is an exploded perspective view of a second preferred embodiment of the present invention.
Figure 10:
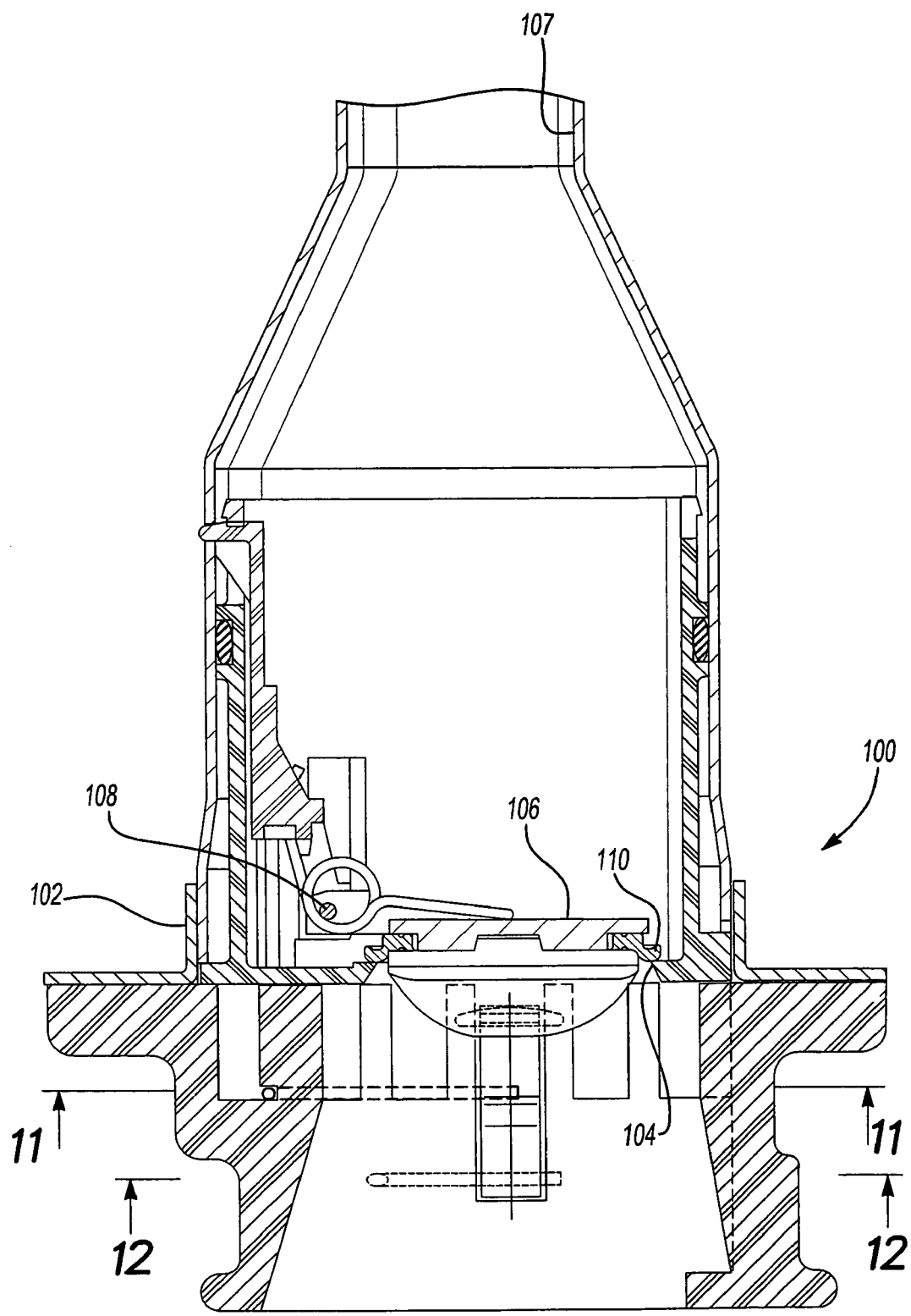
FIG. 10 is a longitudinal sectional view of the second preferred embodiment of the invention.
Figure 11:
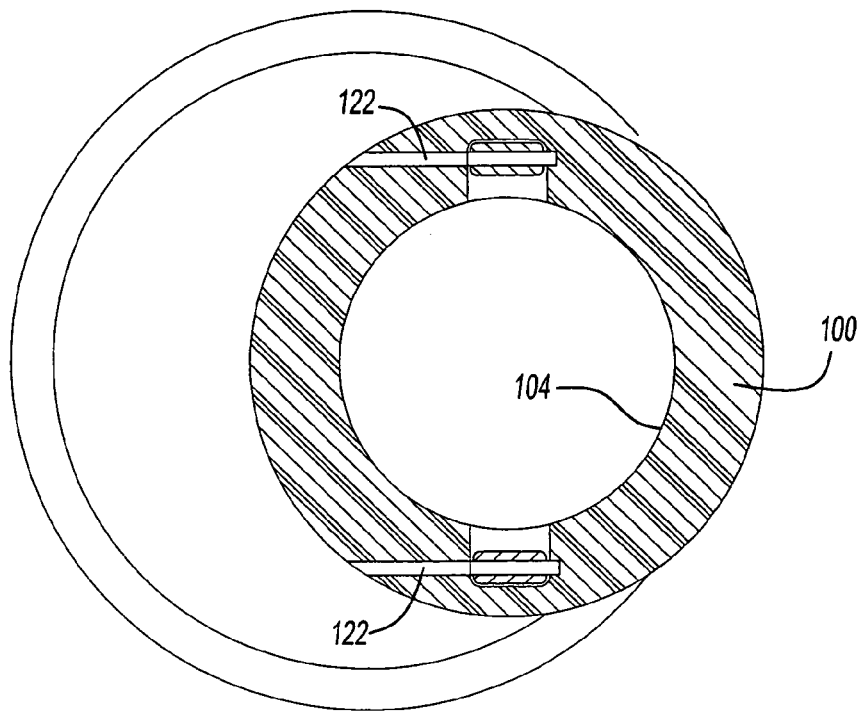
FIG. 11 is a sectional view taken substantially along line 11—11 in FIG. 10.

With reference now to FIGS. 9 and 10, a second preferred embodiment of an automotive fueling system 100 is shown in which a fuel filling system 100 includes a funnel assembly 102. The funnel assembly 102 has a circular port 104 which is adapted to receive a fuel filling nozzle during a fuel filling operation. An outlet 107 of the funnel assembly 102 is fluidly connected to a fuel tank (not shown) of an automotive vehicle.

Figure 15:
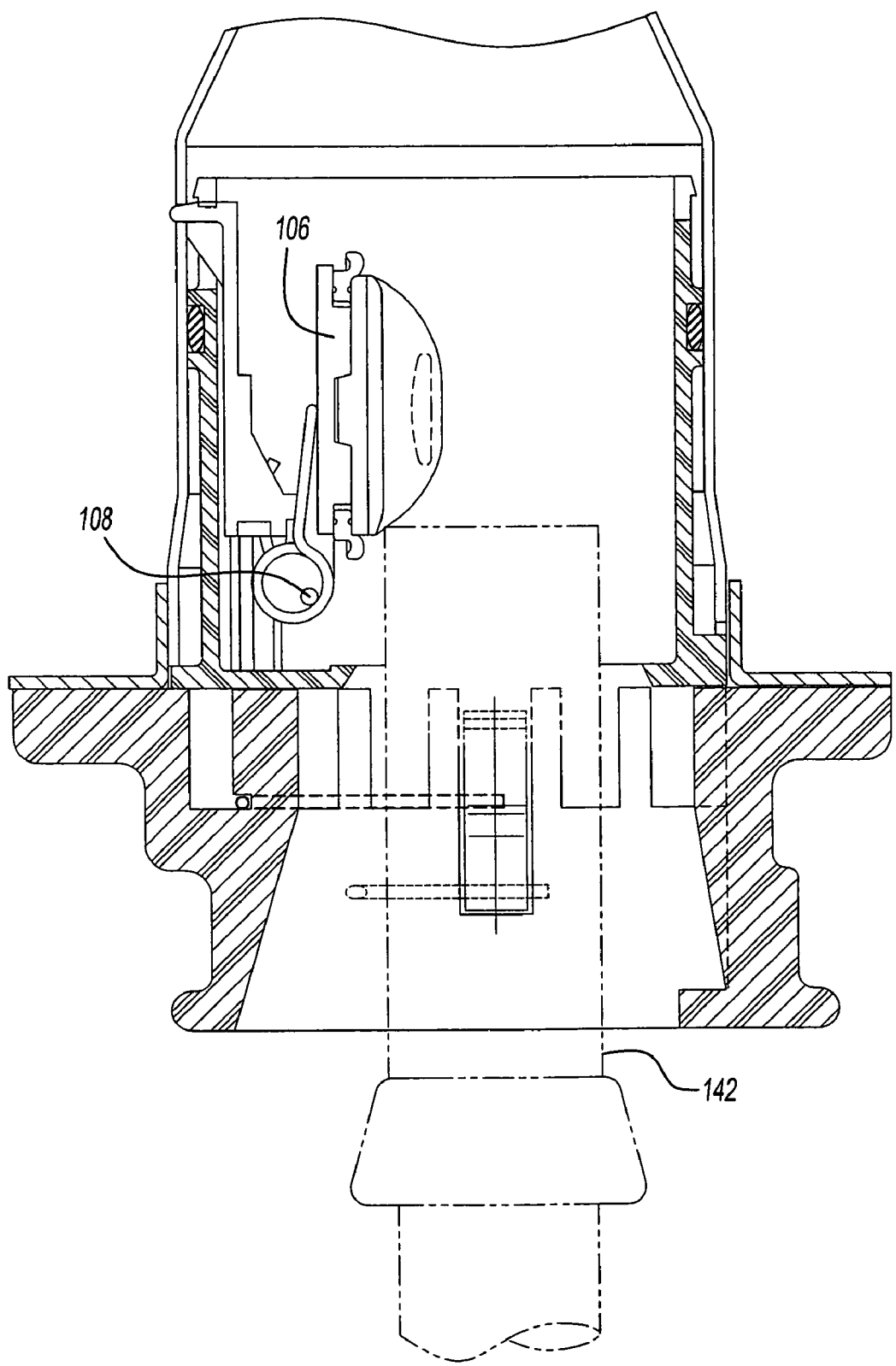
FIG. 15 is a longitudinal sectional view of the second preferred embodiment of the present invention during a fueling operation.

With reference now to FIGS. 10 and 15, a fuel valve 106 is pivotally mounted about a pivot axis 108 to the funnel assembly 102 between a closed position, illustrated in FIG. 10, and an open position, illustrated in FIG. 15. An annular seal 110 is attached to the valve 106 and this seal 110 engages the funnel assembly 102 when the fuel valve 106 is in its closed position (FIG. 10) thus fluidly sealing the port 104.

With reference now to FIGS. 10–14, at least one and preferably a pair of latches 120 are each pivotally mounted about a pivot pin 122 at an intermediate point to the fuel funnel assembly 102 such that the latches 120 are diametrically opposed to each other with respect to the fuel port 104. The pivot pins 122 preferably pivot their respective latches 120 about an axis which is perpendicular to the pivot pin 108 for the fuel valve 106. Furthermore, the latches 120 are constructed of a rigid, durable material, such as metal.

Figure 13:
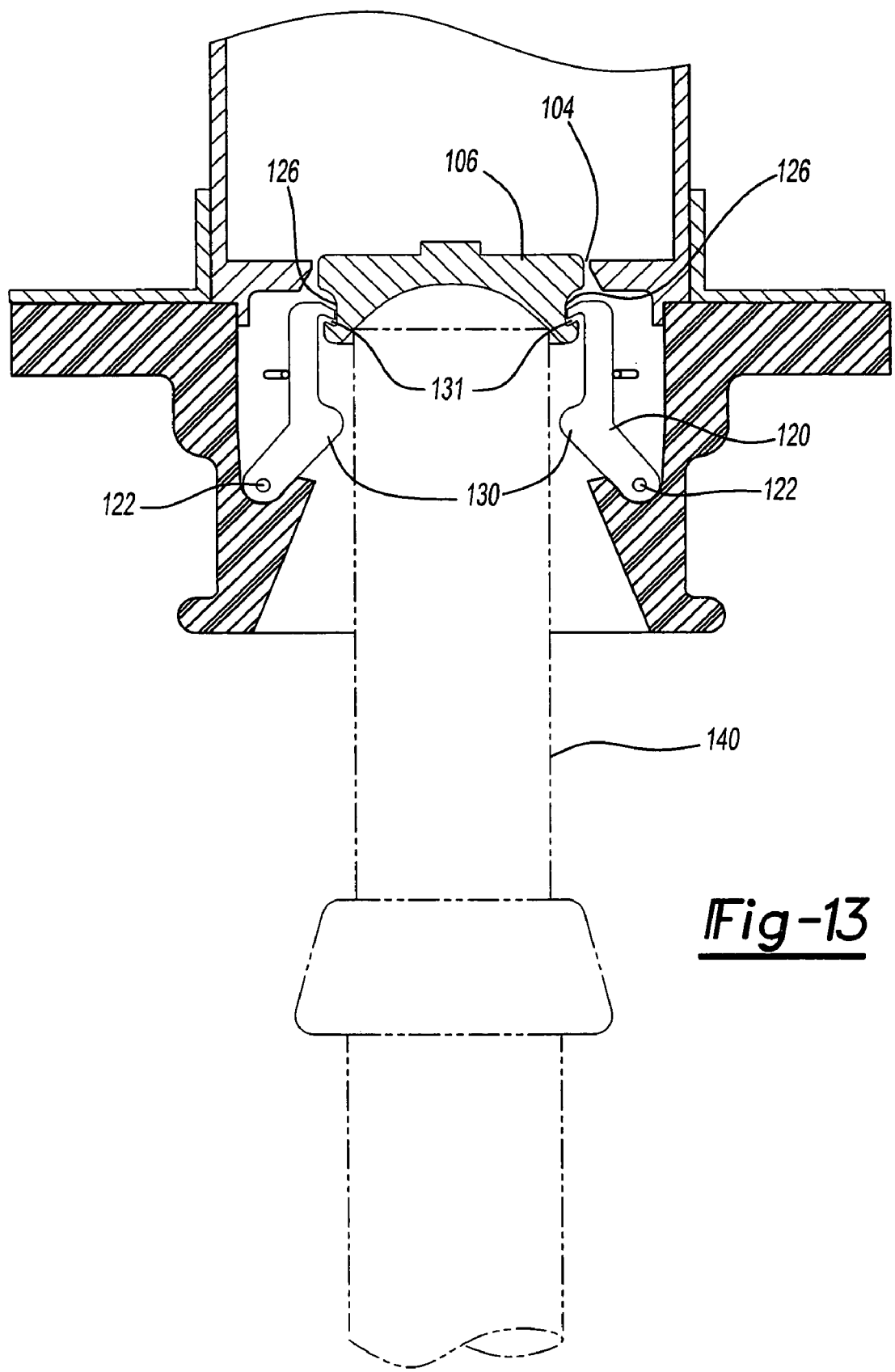
FIG. 13 is a sectional view illustrating the operation of the second embodiment of the present invention with an improperly sized fuel nozzle.
Figure 14:
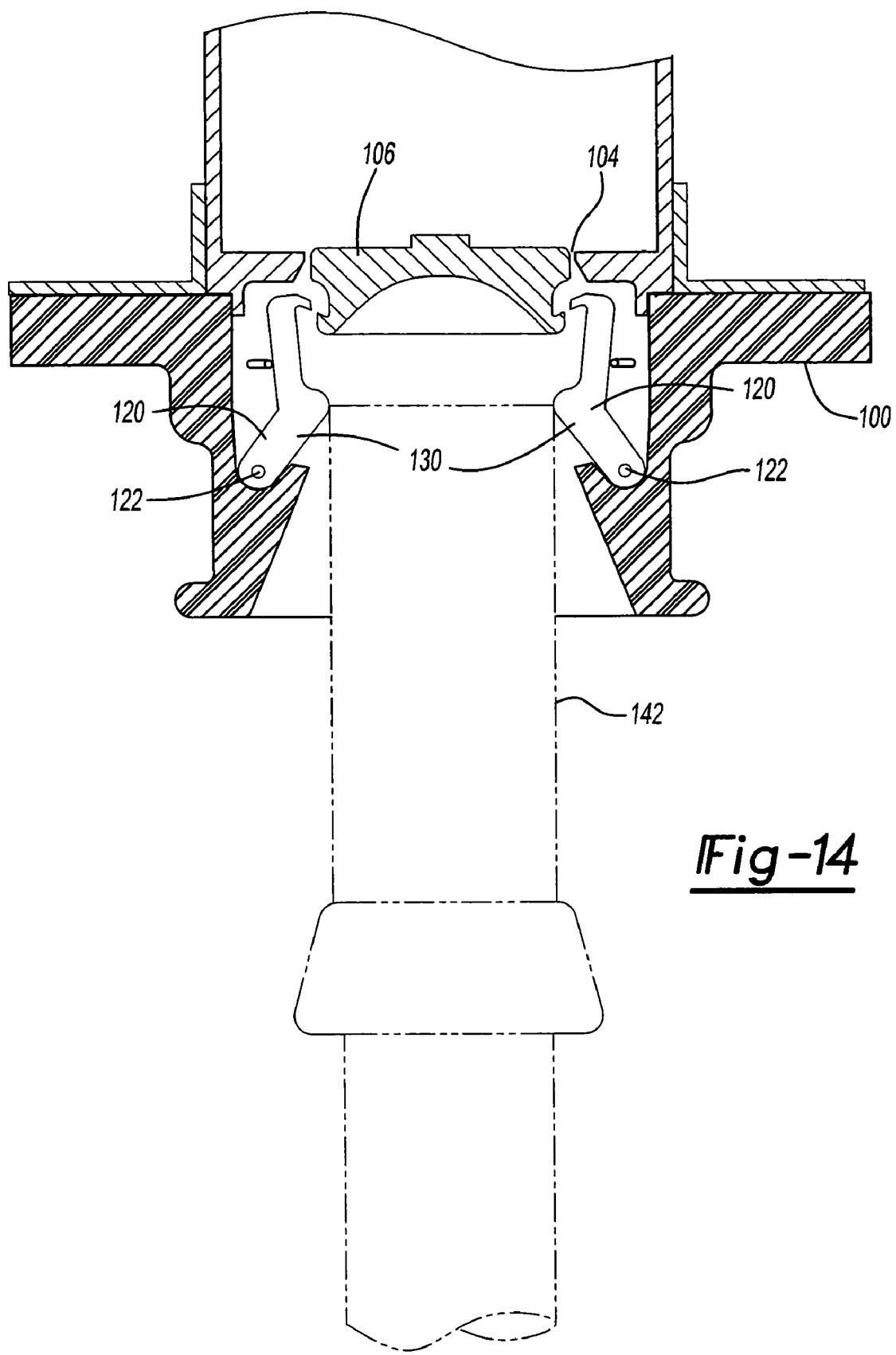
FIG. 14 is a view similar to FIG. 13, but illustrating operation of the second embodiment of the present invention upon insertion of a properly sized nozzle.

With reference now to FIGS. 13 and 14, the latches 120 are pivotally mounted between a locked position, illustrated in FIG. 13, and an unlocked position, illustrated in FIG. 14. In their locked position, the latches 120 each engage a locking recess 126 formed in the fuel valve 106 thus retaining the fuel valve 106 in its closed position. Conversely, in their unlocked position, illustrated in FIG. 14, the latches 120 pivot away from the fuel valve 106 about their pivot pins 122 thus enabling the fuel valve 106 to move from its closed position (FIG. 10) and to its open position (FIG. 15).

The latches 120 are independently pivotal about their pivot pins 122 with respect to each other. Furthermore, if either one of the latches 120, or both of the latches 120, engage the locking recesses 126 in the fuel valve 106, either one or both of the latches 120 will retain the fuel valve 106 in its closed position.

Figure 12:
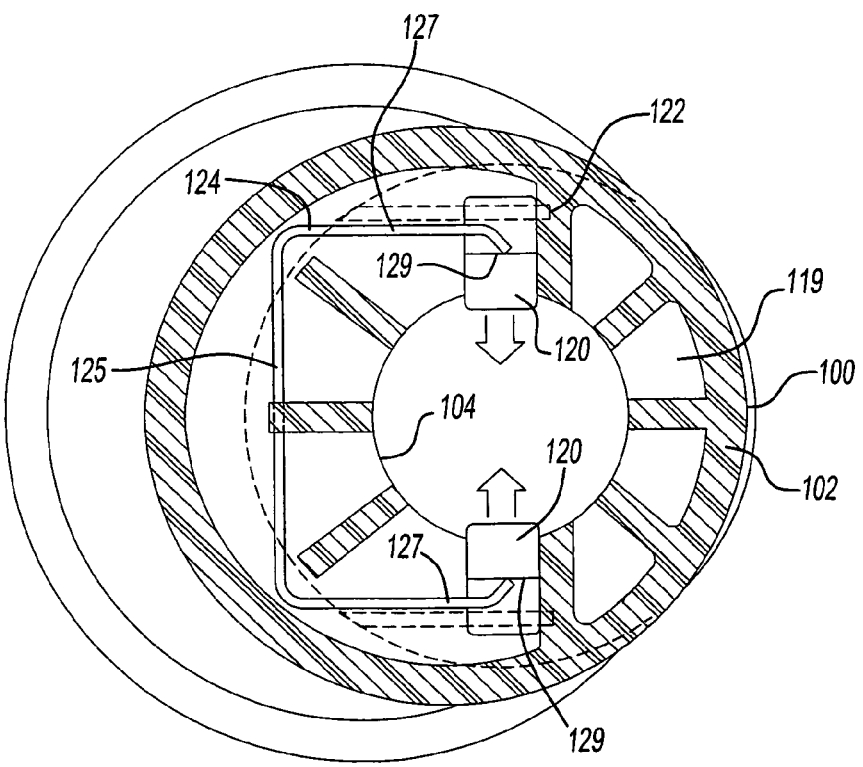
FIG. 12 is a view taken substantially along line 12—12 in FIG. 10.

With reference now particularly to FIG. 12, a U-shaped spring 124 having a base 125 and two spaced apart and generally parallel legs 127 is mounted to the funnel assembly 102. The legs 127 engage an outer surface 129 of the latches and urge the latches 120 toward their locking position (FIG. 13). The spring 124 may be of any conventional construction, such as spring steel. Additionally, one or more (optionally valved) drain ports 119 are formed in the funnel assembly 102 which extend between opposite sides of the fuel valve 106.

With reference now to FIGS. 13 and 14, each latch 120 includes a ramp actuator surface 130 which protrudes at least partially across the fuel port 104. These ramp surfaces 130 taper both inwardly and downwardly toward the outlet 107 of the funnel assembly.

The spring 124 preferably has a spring force which allows the valve 106 to open slightly at a predefined vacuum to allow vacuum relief. A small amount of free play 131 (FIG. 13) between each latch 120 and the valve 106 allows the valve 106 to open slightly even while latched for vacuum relief of the fuel tank.

With reference now to FIG. 13, an attempt to fuel the automotive vehicle using a fuel nozzle for a fuel improper to the vehicle is shown. For example, in FIG. 13 the diameter of the fuel port 104 together with the position of the latches 120 is illustrated for a diesel fuel system. The fuel nozzle 140, however, is illustrated as a fuel nozzle for unleaded gasoline which is of smaller diameter than a diesel nozzle. Consequently, upon insertion of the improper fuel nozzle 140 into the funnel assembly 100, the fuel nozzle 140 abuts against the fuel valve 106. At this time, however, the latches 120 maintain engagement with the fuel valve 106 thus locking the fuel valve 106 in its closed position and precluding refilling of the automotive vehicle with the improper fuel. Furthermore, even if the fuel nozzle 140 is inserted so that it engages one of the actuator surfaces 130 on one of the latches 120 thus moving that one latch 120 to its open position, the other latch 120 will retain the fuel valve 106 in its closed position.

Conversely, with reference to FIG. 14, a fuel nozzle 142 for the proper fuel is shown inserted into the funnel assembly 100. When this occurs, the fuel nozzle 142 engages the actuator surfaces 130 of both latches 120 thus pivoting both latches 120 to their unlocked position. At this time, the fuel valve 106 is free to move to its open position which occurs upon subsequent insertion of the fuel nozzle 142 as illustrated in FIG. 15.

From the foregoing, it can be seen that the embodiment of the invention illustrated in FIGS. 9–15 provides a simple and yet highly effective means for not only sealing the fuel port 104 but also preventing refueling of the vehicle with the improper fuel.

Furthermore, since the latches are constructed of a rigid material and pivotally mounted to the funnel assembly, long and failure-free operation of the latches is achieved. Additionally, the latches provide protection from water ingestion due to high pressure wash and from other unwanted intrusions.

From the foregoing, it can be seen that the present invention provides a simple, and yet totally effective capless automotive fueling system. Having described my invention, however, many modifications thereto will become apparent to those skilled in the art to which it pertains without deviation from the spirit of the invention as defined by the scope of the appended claims.

What is claimed is:

1. An automotive fueling system comprising:
   a funnel assembly having a circular port adapted to receive a fuel filling nozzle,
   a fuel valve pivotally mounted to said funnel assembly and movable between an open position in which said port is open and a closed position in which said fuel valve overlies and covers said port, said valve having a pair of diametrically opposed recesses on an outer periphery of said valve,
   at least one latch mounted to said fuel assembly, said latch being constructed of a rigid material independently pivotally mounted at an intermediate point on said latch to said funnel assembly and movable between a locked position in which either one or both of said latches engage said valve recesses and retain said valve in said closed position, and an unlocked position in which both said latches disengage from said valve recesses and enable said valve to move to said open position,
   wherein each latch includes an actuator surface engageable by a fuel nozzle inserted into the funnel to move said latches from said locked to said unlocked position.

2. The invention as defined in claim 1 wherein said at least one latch comprises two latches.

3. The invention as defined in claim 2 wherein said latches are diametrically opposed to each other.

4. The invention as defined in claim 3 wherein said fuel valve pivots about an axis perpendicular to a pivotal axis of said latches.

5. The invention as defined in claim 1 wherein said actuator surface comprises a ramp surface.

6. The invention as defined in claim 2 and comprising a spring mounted to said funnel assembly which urges said latches toward said locked position.

7. The invention as defined in claim 5 wherein said ramp surface tapers inwardly and downwardly with respect to said funnel assembly.

8. The invention as defined in claim 6 wherein said spring is U-shaped having a base and two spaced apart legs, said legs engaging an outer surface of said latches.

9. The invention as defined in claim 1 and comprising a normally closed pressure relief valve open at one end to an inside chamber of said funnel, said pressure relief valve moving to an open position whenever a pressure differential between said inside chamber and ambient air exceeds a preset threshold.

10. The invention as defined in claim 6 and comprising a predefined amount of free play between each said latch and said valve.

11. The invention as defined in claim 10 where said spring has a spring force calibrated to allow said valve to open slightly while latched for vacuum relief of the fuel tank.

12. The invention as defined in claim 1 and comprising a fuel drain formed in said funnel assembly which extends between opposite sides of said valve.

* * * * *